United States Patent [19]
Freiburger, Jr.

[11] 3,988,007
[45] Oct. 26, 1976

[54] TENSIONING APPARATUS

[76] Inventor: Kenneth J. Freiburger, Jr., R.R. No. 3 North,, Kendallville, Ind. 46755

[22] Filed: July 31, 1975

[21] Appl. No.: 600,822

[52] U.S. Cl. .................................. 254/164; 24/269; 52/23; 248/316 A
[51] Int. Cl.² .................. A63B 61/04; B65D 63/00
[58] Field of Search .............. 254/161, 164, 51, 52; 24/269, 71.2, 68; 52/3–5, 23

[56] References Cited
UNITED STATES PATENTS

| | | | |
|---|---|---|---|
| 940,424 | 11/1909 | Barclay | 254/161 |
| 1,067,641 | 7/1913 | Butler | 254/161 |
| 3,747,288 | 7/1973 | Grimelii | 24/269 X |
| 3,884,450 | 5/1975 | Brammer | 24/269 |
| 3,903,704 | 9/1975 | Spiridonov | 52/23 |

FOREIGN PATENTS OR APPLICATIONS

| | | | |
|---|---|---|---|
| 878,128 | 7/1949 | Germany | 24/71.2 |

Primary Examiner—Al Lawrence Smith
Assistant Examiner—Robert C. Watson

[57] ABSTRACT

A strap tensioning apparatus having a U-shaped housing with two upstanding walls, each all provided with an opening for rotatably supporting a rigid elongated bolt having a head at one end and threaded at the other end to threadedly engage a nut. A washer is secured on the bolt shank proximal to the head. Radial ratchet protrusions are coined on the washer surface and complementary ratchet engaging surfaces are formed on one wall of the U-shaped housing to provide one-way rotation of the bolt therein. A spring member may be provided between the nut and the other housing wall to exert a longitudinal force on the bolt thereby urging the ratchet members into engagement. A longitudinal slot is provided in the bolt to receive and hold a strap end as it is wound upon the bolt shank intermediate the housing walls. The housing may be resiliently attached to a ground anchor.

16 Claims, 18 Drawing Figures

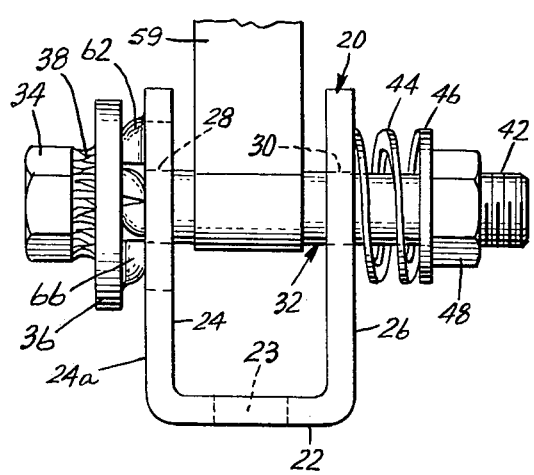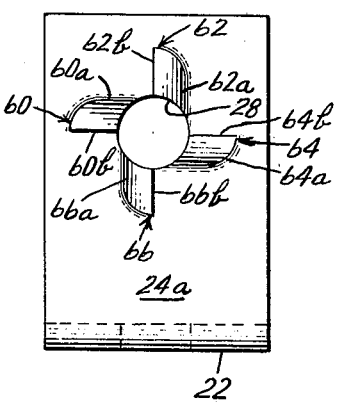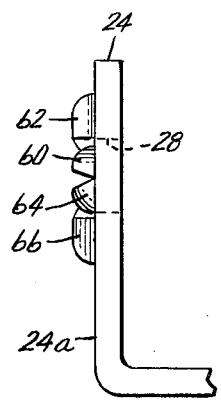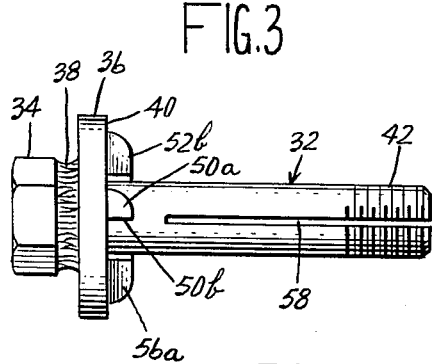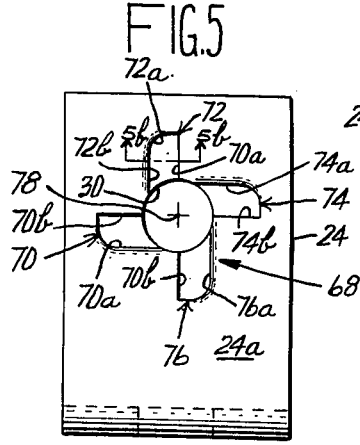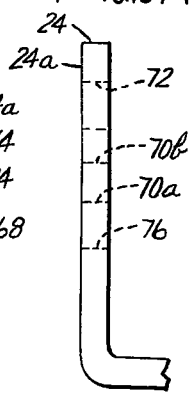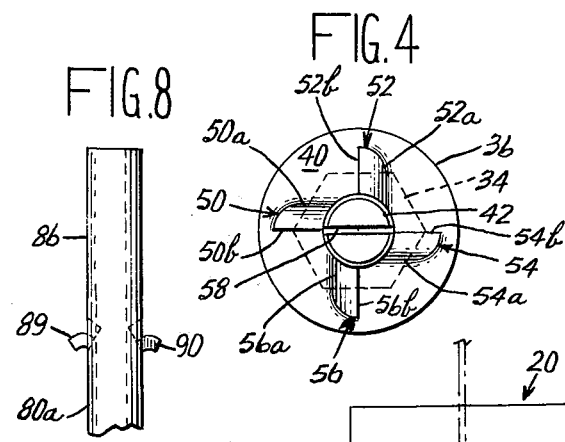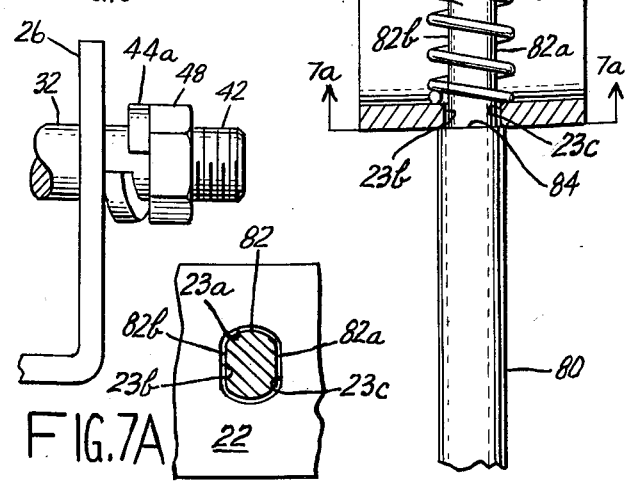

TENSIONING APPARATUS

BACKGROUND OF THE INVENTION

1. Field of the Invention

This invention is in the field of strap tensioning devices of rigid construction and capable of imparting considerable tensional forces.

2. Brief Description of Prior Art

Many devices in the prior art are available for strap tensioning, such as those used in securing mobile homes and their pads to the ground. Certain of these devices, such as those shown in U.S. Pat. Nos. 3,416,763 and 3,856,265, provide for an elongated rotatable member around which the strap is wound. The rotatable member is provided with holding surfaces which are engageable with corresponding holding surfaces in a rigid fixed plate or wall. The rotatable member is turned, applying tensional force to the strap, and then, the member is moved longitudinally, or axially, until the holding surfaces on the member and the rigid plate come into engagement to hold the member against unwinding rotation. In these devices it is necessary to first manually disengage the holding surfaces, apply rotative tensioning forces to the rotatable member, and then manually reengage the holding surfaces. Other devices, such as those shown in U.S. Pat. Nos. 1,467,860 and 1,736,848, use a simple ratcheting member around which a strap or wire is wound but since the ratchet holding force is a spring-urged pawl acting against ratchet teeth, relatively small tensional forces can be applied to the strap or wire.

BRIEF SUMMARY OF THE INVENTION

This invention provides a belt, strap, cable or the like tensioner having a U-shaped housing with two upstanding walls or legs, each having an opening therein to rotatably support an elongated bolt having a head formed at one end and threaded at the other end, the threaded end extending from the housing to threadedly receive a nut. A washer is fixed, as by welding, to the bolt proximal the head end and has protruding from a surface thereof a plurality of cam elements. Each cam element has a cam surface and a holding surface perpendicular to one housing wall. A spring may be placed intermediate the nut and one housing wall to provide a longitudinal force on the bolt urging the cam elements against the one housing wall. The wall against which the cam elements are urged is provided with cooperating surfaces to hold the member against rotation in one direction and provide relative rotation between the member and wall in the other direction to provide a ratcheting effect. In one embodiment the surfaces on the wall are in the form of protruding cam elements cooperating with the washer cam elements and in another embodiment, the surfaces are formed in the housing wall to receive the washer cam elements in holding engagement.

The housing may be attached to an anchor rod which is inserted through an opening in the housing base. A washer is secured to the rod end and a circular spring is placed on the rod between the washer and the housing base, thus resiliently mounting the rod to the housing to compensate for shifting of the strapped load relative to the anchor rod and prolong strap life and minimize loose strap condition. In a particular application of this invention the straps are used to tie down mobile homes. The anchor rods are secured in the ground below the frost line. When the level of the ground surface varies, due to frost and the like, the resilient mounting between the housing and the rod will compensate for the surface level change.

An object of this invention is to provide a strap tensioner of rigid, sturdy construction, capable of providing high tensional forces to the strap, and which is convenient to operate.

Another object of this invention is to provide in a device of the foregoing object a one-way rotational ratchet interface between two surfaces, a substantially uniform transverse force being applied between said surfaces to urge said surfaces against one another in ratcheting relation.

A further object is to resiliently mount the tensioner of the foregoing objects to a mounting rod to accommodate level changes in the strapped load and prolong strap life.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side view of a tensioner of this invention showing a strap, in part, installed in the embodiment;

FIG. 2 is an end view of the housing of the tensioner shown in FIG. 2;

FIG. 2A is a partial side view of the housing shown in FIG. 2;

FIG. 3 is a side view of the bolt shown in tensioner of FIG. 1;

FIG. 4 is an end view of the bolt shown in FIG. 3;

FIG. 5 is an end view of an alternative embodiment of the housing shown in FIG. 2;

FIG. 5A is a partial side view of the housing shown in FIG. 5;

FIG. 5B is a section taken at 5b—5b of FIG. 5;

FIG. 6 is a partial side view showing an alternative embodiment of spring member shown in FIG. 1;

FIG. 7 is a side view of an anchor rod and the tensioner housing, which is shown in section;

FIG. 7A is a partial section taken at 7a—7a of FIG. 7;

FIG. 8 is a partial view of an alternative embodiment of the anchor rod;

DETAILED DESCRIPTION OF THE DRAWINGS

Figure 9:
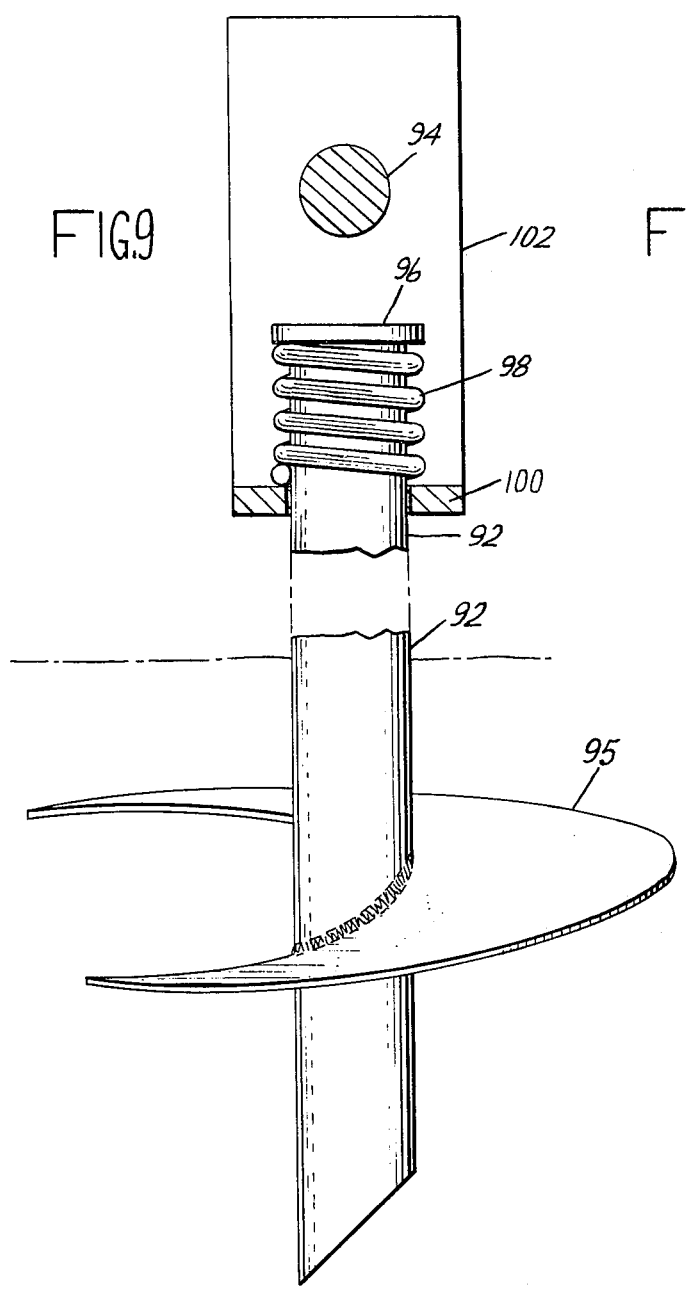
FIG. 9 is a view partially in section of an alternate embodiment of an anchor rod resiliently mounted in a housing.

Referring to the drawings, FIGS. 1–4, U-shaped housing 20 has base 22 with centrally located opening 23 and upstanding walls 24 and 26. Openings 28 and 30 are formed in walls 24 and 26 respectively to receive and rotatably support elongated bolt 32. Hexagonal head 34 is formed at one end of bolt 32 and axially spaced therefrom, but proximal thereto is washer 36 which is secured, as by weld 38, to bolt 32. The spacing between washer 36 and head 34 provides clearance for a wrench, not shown, to conveniently rotate bolt 32, for reasons which will become evident. Also, by welding washer 36 in this manner, no weld flashing occurs on face 40 of washer 36. It will be understood that washer 36 may be integral with bolt head 34.

Bolt 32 is threaded at end 42 and this threaded end is inserted into openings 28 and 30 and extends beyond wall 26. Spring 44 is inserted over end 42 and washer 46 is inserted over end 42 and against spring 44. Nut 48 is turned on threaded bolt end 42 against washer 46 to exert a longitudinal axial spring force on bolt 32 to urge washer 36 against wall 24.

Referring to FIGS. 3 and 4, radial ratchet elements 50, 52, 54 and 56 are formed on or coined from washer 36 and protrude from face 40. Elements 50, 52, 54 and 56 have cam surfaces 50a, 52a, 54a and 56a on one side thereof and holding surfaces 50b, 52b, 54b and 56b on the other side thereof which surfaces are perpendicular to face 40, extend generally radially from the center of washer 36, and are angularly spaced 90° from the next adjacent holding surface. A longitudinal slot 58 is formed in bolt 32 to receive an end of strap 59 (FIG. 1), which typically is of a flexible metallic material. The strap end will be firmly held in the slot 58 as bolt 32 is rotated and the strap 59 is wound around bolt 32 and upon itself. If a cable is used, then a hole would be formed in bolt 32 to receive a cable end.

Referring to FIGS. 2 and 2A, the outer surface 24a of wall 24 has cooperating ratchet elements 60, 62, 64 and 66 formed on or struck therefrom to protrude outwardly from wall 24a. Elements 60, 62, 64 and 66 have cam surfaces 60a, 62a, 64a and 66a on one side thereof and holding surfaces 60b, 62b, 64b and 66b on the other side thereof which are perpendicular to face 24a, extend radially from the center of opening 28 and are angularly spaced 90° from the next adjacent holding surface.

When bolt 32 is fully inserted in openings 28 and 30, each of elements 50, 52, 54 and 56 register with one of elements 60, 62, 64 and 66 according to the rotative position of bolt 32. The surfaces 50b, 52b, 54b and 56b are in face to face contact with the corresponding surfaces 60b, 62b, 64b and 66b and prevent rotation of bolt 32 in a clockwise direction as viewed in FIG. 2. Washer 36 is held against face 24a by the force of spring 44.

However, bolt 32 may be rotated in a counterclockwise direction as by applying a wrench or other suitable tool to head 34 which causes cam surfaces 50a, 52a, 54a and 56a to engage cam surfaces 60a, 62a, 64a and 66a and ride thereagainst to lift washer 36 away from surface 24a against the longitudinal or axial spring force of spring 44. When each of surfaces 50b, 52b, 54b and 56b become aligned with the next one of surfaces 60b, 62b, 64b and 66b, washer 36 snaps rightwardly, FIG. 1, bolt 32 then having been rotated to a new rotative position 90° counterclockwise from its starting position. This process may be continued until the desired tension is applied to strap 5. Adjustments are made in quarter turn increments but this may be varied as desired by changing the number of cam elements on washer 36 and surface 24a.

Alternatively, face 24a may have openings 70, 72, 74 and 76 machined or stamped therein to obtain the configuration shown in FIGS. 5 and 5A. Openings 70, 72, 74 and 76 have rounded cam edges 70a, 72a, 74a and 76a (FIG. 5B) and holding surfaces 70b, 72b, 74b and 76b which are along radial lines from center 78 and are angularly spaced 90° apart.

Each of cam elements 50, 52, 54 and 56 will locate in a respective one of openings 70, 72, 74 and 76, depending upon the rotational position of bolt 32, and will be held under the longitudinal spring force of spring 44. Surfaces 50b, 52b, 54b and 56b will be in face to face contact with the corresponding surfaces 70b, 72b, 74b and 76b preventing any clockwise rotation of bolt 32. However, counterclockwise rotation will cause cam surfaces 50a, 52a, 54a and 56a to ride over rounded cam edges 70a, 72a, 74a, 76a to separate washer 36 from face 24a until each of surfaces 50b, 52b, 54b and 56b are in alignment with the next one of surfaces 70b, 72b, 74b and 76b at which point washer 36 will snap longitudinally toward face 24a positioning bolt 32 a quarter turn counterclockwise from its starting position.

This invention may also be used without the longitudinal spring force placed on bolt 32 by spring 44. In this embodiment, the nut 48 would be tightened against wall 26 (FIG. 1) in the fastened position. To make an adjustment in the tension of strap 29, the nut 48 would be loosened on bolt 32 sufficiently to provide an axial or transverse clearance between the nut 48 and the wall 26 so as to permit the ratchet elements 50 to 56 to clear the cooperating ratchet surfaces on wall 24. By "leaning" on the wrench as the tension adjustment is made, the ratchets can be urged together after each increment of rotation. When the desired tension in strap 59 is achieved, the nut 48 is retightened on threads 42 until it abuts wall 26 holding the cooperating ratchet surfaces on washer 36 and wall 24 firmly in engagement.

Referring to FIG. 6, an alternate spring configuration is shown. A spring washer 44a is inserted between nut 48 and wall 26 to exert the longitudinal force on bolt 32. The embodiment otherwise operates as described above.

This invention provides a ratcheting tensioner of sturdy rigid construction, having ease of operation and providing substantially high tensional forces to the strap 59. The only actuating force required is rotation of bolt 32 in a tensioning direction, as with a wrench applied to head 34. The ratchet elements 50–56 automatically disengage and reengage with corresponding ratchet elements 60–66 on wall 24 to provide one-way incremental rotation of bolt 32 in a tensioning direction, with a positive holding mechanism against reverse or unwinding rotation at each increment. A substantially uniform longitudinal spring force is applied to bolt 32 as it is rotated the number of increments required to obtain the desired tension in strap 59.

Referring to FIGS. 7 and 7A, opening 23a in base 22 is oblong and has parallel sides 23b and 23c. An elongated rod 80 has flats 82a, 82b coined on extension 82 which is insertable in opening 23a, sides 82a and 82b having a slidable clearance with sides 23b and 23c, respectively. Shoulder 84 is formed between extension 82 and rod 80 and abuts the lower side of base 22 to provide an upper travel limit for rod 80.

High pressure die spring 86 is inserted over extension 82 and a washer 88 is secured, as by welding, to the top of extension 82 to contain spring 86 on thereon. Thusly mounted, housing 20 is resiliently supported relative to rod 80. As tension is increased in strap 59, spring 86 compression becomes increased. Any change in strap load is compensated for by the resilience in spring 86.

Spring 86 is a heavy die spring typically having a 1¼ inches outer diameter and a ¾ inch diameter exerting 3,000 psi to 4,000 psi. More uniform tension is applied to strap 59, prolonging strap life since changes in position of the strapped load are taken up by spring 86. Also, a loose strap condition is minimized by the take-up provided by spring 86.

Referring to FIG. 8, rod 80a has a round cross-section extension 86. Stops are provided by ears 89, 90 coined from rod 80a. In this embodiment, the opening 23 in base 22 is circular and has a sliding fit with extension 86. A spring is placed over the extension 86 and a washer welded to the top thereof as explained above for extension 82.

Referring to FIG. 9, a further embodiment of the rod is shown. Rod 92 is circular in cross-section having no stops along shank thereof, bolt 94 providing a stop for the upper limit of rod travel. Washer 96 is welded to the top end of rod 92 and a heavy die spring 98 is inserted between washer 96 and base 100 of U-shaped housing 102. Rod 92 has an auger element 93 at the lower end thereof for securing the rod end in the ground 95 a depth which is typically below the frost line.

Figure 11A:
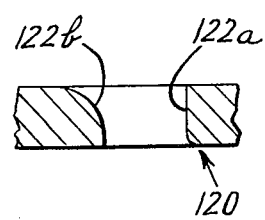
FIG. 11A is a section taken at 11a—11a of FIG. 11.
Figure 10:
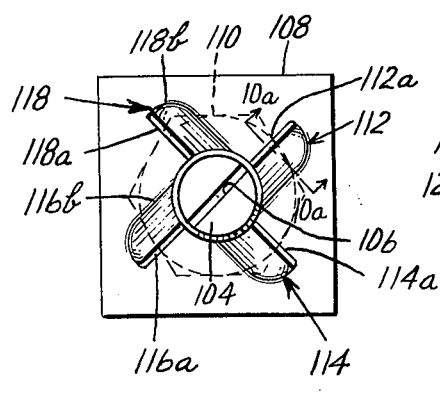
FIG. 10 is an end view of an alternate bolt-washer embodiment.
Figure 11:
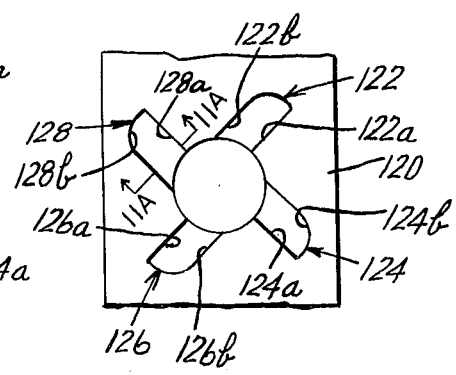
FIG. 11 is an end view of the housing for the embodiment of FIG. 10.
Figure 10A:
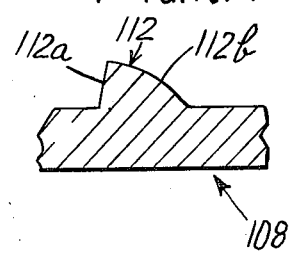
FIG. 10A is a section taken at 10a—10a in FIG. 10.

Referring to FIGS. 10 and 11, a further embodiment is shown. Bolt 104 having longitudinal slot 106 formed along the length thereof has a square washer 108 welded thereto or otherwise formed thereon proximal to head 110 in the manner described heretofore for washer 36 and head 34. Ratchet elements 112, 114, 116 and 118 are formed on or coined from washer 108 and have ratchet holding surfaces 112a, 114a, 116a and 118a extending substantially perpendicularly from washer 108 and spaced 90° from the next adjacent ratchet surface, and are aligned substantially along the diagonals of the square washer 108. The combination of the square washer and the ratchet holding surfaces along the diagonals of the square, permits longer ratchet holding surface for a given amount of washer material. Also, a square shaped washer provides a visual indication of the degree of bolt rotation between ratchet stops. Rounded cam surfaces 112b, 114b, 116b and 118b are formed on ratchet elements 112, 114, 116 and 118, respectively, on element sides opposite to holding surfaces 112a to 118a, respectively, as described for the embodiments heretofore.

A housing wall having cooperating ratchet openings for the embodiment of FIG. 10 is shown in FIG. 11. Wall 120 has openings 122, 124, 126 and 128 machined therein. Each opening 122, 124, 126 and 128 has a ratchet holding surface 122a, 124a, 126a and 128a, respectively, which are substantially perpendicular to wall 120 and register with one of ratchet surfaces 112a to 118a, depending upon the rotative position of bolt 104. Cam surfaces 122b, 124b, 126b and 128b are formed in openings 122, 124, 126 and 128, respectively, opposite to ratchet surfaces 122a, 124a, 126a and 128a, respectively. Each cam surface 122b, 124b, 126b and 128b have rounded edges to facilitate rotation of bolt 104 as heretofore described for surfaces 70b, 72b, 74b and 76b, as shown in FIG. 11A.

Figure 12:
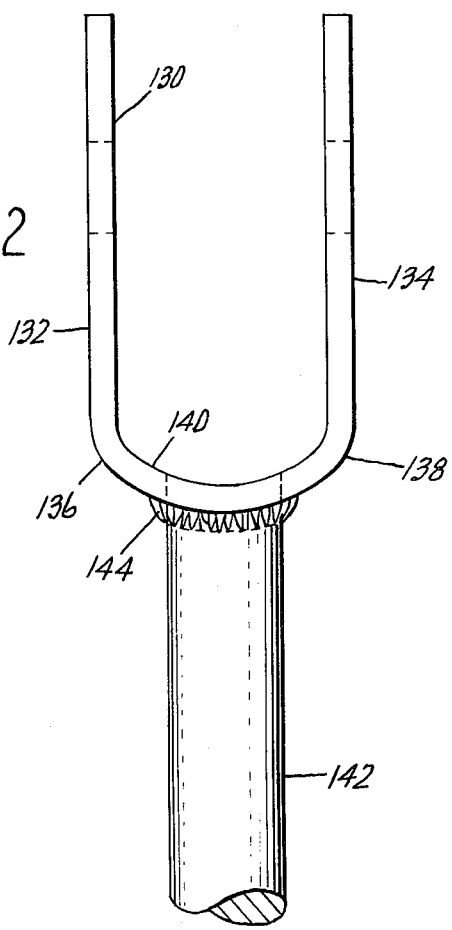
FIG. 12 is a side view of another housing embodiment.

FIG. 12 is a side view of housing 130 having walls 132 and 134 and rounded corners 136 and 138 connecting walls 132 and 134, respectively, to rounded base 140. Rod 142 is welded at 144 to base 140. Providing housing 130 with rounded corners and a rounded base, provides a saving in material over a housing of equivalent size having square corners between the walls and the base.

While there have been described above the principles of this invention in connection with specific apparatus, it is to be clearly understood that this description is made only by way of example and not as a limitation to the scope of the invention.

What is claimed is:

1. A tensioning device for tensioning a flexible element comprising:
   a pair of substantially spaced parallel rigid members in fixed relation one to another;
   an attacher extending transversely between said members and rotatably mounted relative to each of said members;
   means for attaching the element to be tensioned to said attacher intermediate of said members to adjust the tensional forces in said material upon rotation of said attacher;
   and cooperating ratchet means being formed between interfacing surfaces of said attacher and one of said members for providing one-way stepped rotation of said attacher relative said one member;
   said ratchet means comprising a pluralilty of ratchet elements respectively formed on said attacher and on said one member and each element having a holding surface and a cam surface;
   the cam surfaces on said attacher ratchet elements and said one member ratchet elements being engageable on rotation in one direction and the holding surfaces on said attacher elements and said one member elements being engageable to prevent rotation in the other direction; and
   spring means for applying a spring force to said attacher relative said one member to resiliently urge said ratchet means on said attacher and said one member into holding engagement.

2. A tensioning device according to claim 1 with said spring means applying a substantially uniform resilient force for all rotational positions of said attacher.

3. A tensioning device according to claim 1 with:
   a relatively fixed anchor; and
   means for resiliently mounting said spaced parallel members to said anchor to provide resilient movement of said members relative said anchor in the direction of said tensioning.

4. A tensioning device according to claim 3 with said members being rigidly connected by a transverse base having an opening therein, said last means comprising a rod attached to said anchor and having an end insertable through said opening, and spring means interposed said rod end and said housing for exerting a resilient force between said rod end and said housing.

5. A tensioning device according to claim 4 with a stop member formed on said rod and registrable against said base to provide a travel limit of said rod relative said base.

6. A device according to claim 1 with:
   said cooperating ratchet means comprising a plurality of ratchet elements protruding from one of said attacher and said one member and a plurality of openings being formed in the other of said attacher and said one member which are registrable with said ratchet elements; and
   each of said ratchet elements having a cam surface and a holding surface perpendicularly oriented to said one member, each of said openings having a surface perpendicularly oriented to said one member engageable with said ratchet element surface to hold said bolt against rotation in one rotational direction relative said one member, said cam surfaces operating against said plate openings to lift said elements out of said openings and transversely separate said bolt from said one member upon a rotating force applied to said bolt in a rotational direction opposite to said one direction.

7. A device according to claim 1 with:
said cooperating ratchet means comprising a plurality of ratchet elements protruding from interfacing surfaces of said one member and said attacher; and each of said elements having a cam surface and a holding surface, the holding surfaces of the elements on said one member facing and being registrable with the holding surfaces of the elements on said attacher to hold said attacher against rotation relative said one member in one direction, said cam surfaces on said elements on said one member and said attacher engageable with one another on rotation of said member relative said one plate in a direction opposite to said one direction, whereby said cam surfaces on said attacher and said one member will ride against one another to transversely separate said attacher and said one member when said attacher is rotated in said opposite direction.

8. A tensioning apparatus for tensioning a flexible element comprising:
a rigid U-shaped housing having a transverse base portion from which extend two upstanding parallel walls;
an elongated rigid cylindrical bolt having a head at one end and being threaded at the other end, openings formed in each of said walls, to receive and rotatably support said bolt transversely of said walls;
a washer rigidly secured to said bolt proximal to said head;
a plurality of washer ratchet elements formed on said washer, each of said elements having a cam surface and a holding surface;
ratchet element holding means formed on one of said walls and registrable with said elements for holding said ratchet elements;
said threaded end extending through the other of said U-shaped housing walls;
a member threadedly engaged with said threaded end;
a spring member interposed between said member and said other wall to exert a spring force longitudinally of said bolt to urge said elements into engagement with said element holding means;
attaching means for attaching said flexible element to said elongated member intermediate of said walls; and
said ratchet elements being engageable with said holding means to restrict rotational movement of said bolt in one direction and said cam surface being operable against said holding means to lift said washer away from said one wall against the longitudinal spring force of said spring member to provide for rotational movement of said bolt in the direction opposite to said one direction.

9. The tensioning device of claim 1 including:
a transverse base portion connecting said pair of rigid members;
said attacher comprising an elongated rigid cylindrical bolt having a head at one end and being threaded at the other end; openings being formed in each of said rigid members to receive and rotatably support said bolt transversely of said rigid members;
a washer rigidly secured to said bolt proximal to said head;
said ratchet means comprising a plurality of washer ratchet elements formed on said washer, each of said elements having a cam surface and a holding surface; ratchet holding elements formed on one of said rigid members and registrable with said holding surfaces;
said threaded end of said bolt extending through the other of said rigid members;
a nut threadedly engaged with said threaded end;
attaching means for attaching said flexible element to said elongated member intermediate of said rigid members; and
said ratchet elements being engageable with said holding elements to restrict rotational movement of said bolt in one direction and said cam surfaces being operable against said holding elements to lift said washer away from said one wall to provide for rotational movement of said bolt in the direction opposite to said one direction.

10. The device according to claim 9 with said holding elements comprising a plurality of ratchet elements protruding from said one rigid member and engageable with said washer elements, said rigid member elements each having a cam surface and a holding surface, the holding surfaces of said rigid member elements being engageable with the cam surfaces on said washer elements upon rotation of said bolt in a direction opposite to said one direction, whereby said washer cam surfaces and said rigid member cam surfaces ride against one another to lift said washer away from said rigid member against the longitudinal force of said spring means.

11. The device of claim 9 with said cam holding means comprising openings in said one rigid member registrable with said washer ratchet elements, said openings having holding surfaces engageable with said washer holding surfaces of said washer elements to prevent rotation of said bolt in one direction, said openings having cam surfaces engageable with said washer cam surfaces to lift said washer away from said one rigid member against the longitudinal force of said spring member upon rotation of said bolt in a direction opposite to said one direction.

12. Apparatus according to claim 8 with:
a relatively fixed anchor; and
means for resiliently mounting said U-shaped housing to said anchor to provide resilient movement of said members relative said anchor in direction of said tensioning.

13. Apparatus according to claim 12 with: said base having an opening therein; said last means comprising an elongated rod attached to said anchor and having an end insertable through said opening, spring means being interposed said rod end and said housing, for exerting a resilient force between said rod end and said housing.

14. Apparatus according to claim 12 with said rod end having a spring retaining washer member secured to the end thereof, a spring being mounted on said rod between said washer and said housing.

15. A tensioning device for tensioning a flexible element comprising:
- a housing;
- means for attaching the element to be tensioned to said housing;
- means in operative relation to said housing for applying tensional forces to said element to be tensioned;
- an anchor member;
- means for resiliently mounting said housing to said anchor member;
- said housing having an opening therein; and
- said last means comprising a rod attached to said anchor member and having an end insertable through said opening, spring means being interposed said rod end and said housing, for exerting a resilient force between said rod end and said housing.

16. A tensioning device for tensioning a flexible element comprising:
- a housing;
- means for attaching the element to be tensioned to said housing;
- means in operative relation to said housing for applying tensional forces to said element to be tensioned;
- an anchor member;
- means for resiliently mounting said housing to said anchor member;
- said housing having an opening therein;
- said last means comprising a rod attached to said anchor member and having an end insertable through said opening, spring means being interposed said rod end and said housing, for exerting a resilient force between said rod end and said housing; and
- said rod end having a spring retaining washer member secured to the end thereof, a spring being mounted on said rod between said washer and said housing.

* * * * *